No. 7996 X

S. Morrill,

Bee Hive.

Patented Feb. 4. 1834.

Samuel Morrill Dixfield Maine

Letters Patent

Figure 1:
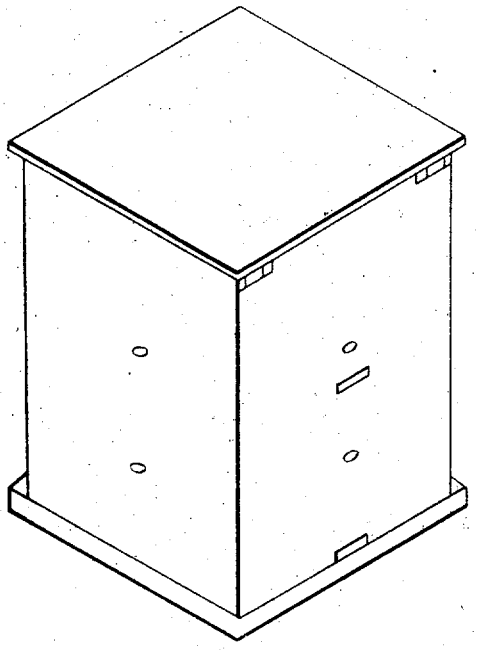
Figure 3:
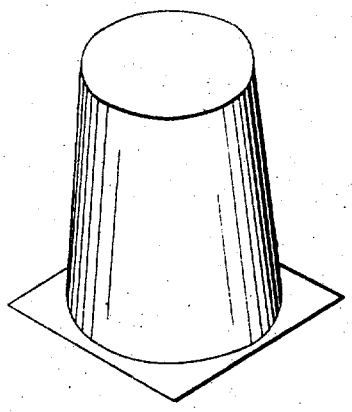
Figure 2:
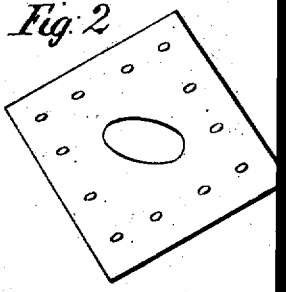

The Schedule refered to in these letters Patent and making part of the same containing a discription in the words of the said Samuel Morrill himself of his improvement in the Bee Hive To all to whom these present shall come. Be it known that I Samuel Morrill of Dixfield in the County of Oxford and State of Maine have invented a new and useful improvement in the Bee Hive - and the following is a full and exact discription of my said improvement I first procure a hive of common dimensions about a foot and a half high and about sixteen inches across the same. I prepare a wooden plate from half an inch to an inch thick of the full size of the inside of the Hive so that it may keep in and be confined about five inches from the top of the Hive. This plate is perforated with small holes to admit of the Bees passing through the same I take common glass tumblers and place them inverted on the plate having first placed a thin piece of wood on the mouths of each Tumbler perforated with a hole sufficiently large to admit the bees - The Hive is prepared with a lid to rise on hinges and also sticks in the usual form to support the comb below the wooden plate The Hive is represented in the drawing accompanying and making part of the description by Fig 1. Fig 2. represents the wooden partition plates and Fig 3 of the drawing represents the Tumbler and the plate covering the mouth

What I claim as new and of my own invention is the use of these Tumblers in which to receive the

Henry and the manner of preparing the partition plate

Witnesses

John Otis  Samuel Morse

Simon Bryan

No. 341 in H.

Drawing